United States Patent [19]

Takamatsu et al.

[11] Patent Number: 4,536,060

[45] Date of Patent: * Aug. 20, 1985

[54] SEAL FOR DYNAMIC SCATTERING-TWISTED NEMATIC LIQUID CRYSTAL DISPLAY

[75] Inventors: Toshiaki Takamatsu, Tenri; Fumiaki Funada, Yamatokoriyama; Yutaka Ishii; Tomio Wada, both of Nara, all of Japan

[73] Assignee: Sharp Kabushiki Kaisha, Osaka, Japan

[*] Notice: The portion of the term of this patent subsequent to Sep. 20, 2000 has been disclaimed.

[21] Appl. No.: 233,520

[22] Filed: Feb. 11, 1981

[30] Foreign Application Priority Data

Feb. 29, 1980 [JP] Japan .................................. 55-25912

[51] Int. Cl.³ ........................... G02F 1/13; C09K 3/34
[52] U.S. Cl. .................................... 350/343; 350/346; 252/299.2
[58] Field of Search .................... 350/343, 346, 350 R; 252/299.2

[56] References Cited

U.S. PATENT DOCUMENTS

| | | |
|---|---|---|
| 3,700,306 | 10/1972 | Cartmell et al. |
| 3,866,313 | 2/1975 | Yih .................................... 350/343 X |
| 3,920,576 | 11/1975 | Jones, Jr. et al. ........... 350/350 R X |
| 3,956,168 | 5/1976 | Arai et al. .......................... 252/299.2 |
| 3,967,882 | 7/1976 | Kubota et al. ................... 350/343 X |
| 3,994,567 | 11/1976 | Matsuo et al. ................... 350/343 X |
| 4,155,872 | 5/1979 | Shigehiro et al. .......... 350/350 R X |
| 4,291,949 | 9/1981 | Wada et al. ...................... 350/340 X |
| 4,325,610 | 4/1982 | Inoue .................................... 350/343 |
| 4,405,209 | 9/1983 | Funada et al. ................... 350/346 X |

FOREIGN PATENT DOCUMENTS 2418022 11/1974 Fed. Rep. of Germany .

OTHER PUBLICATIONS

Uchida, T. et al., "A Display Device Using the Depolarization in a Twisted Nematic Liquid–Crystal Layer," *IEEE Transactions on Electron Devices*, vol. ED–26, No. 9, (Dec. 1979), pp. 1375–1376.

Fukuda, I. et al., "Two–Frequency Addressing of a DTN–Cell," *Molecular Crystals & Liquid Crystals*, vol. 68, (1981), pp. 311–330.

*Primary Examiner*—John K. Corbin
*Assistant Examiner*—Richard F. Gallivan
*Attorney, Agent, or Firm*—Hubbell, Cohen, Stiefel & Gross

[57] ABSTRACT

A liquid-crystal display device which is effective for the display of images particularly in a TV set and in which the liquid-crystal layer contains a dopant in a specific range of quantity and the substrates are adhered to each other and sealed by two resin layers in which the outer one is a thermoplastic polyamide and the inner one is a saturated polyester.

13 Claims, 4 Drawing Figures

SEAL FOR DYNAMIC SCATTERING-TWISTED NEMATIC LIQUID CRYSTAL DISPLAY

BACKGROUND OF THE INVENTION

1. Field of the Invention

This invention relates to a liquid crystal display device, and more particularly, to a liquid crystal display device comprising a dynamic scattering liquid crystal cell formed by a nematic or long-pitched cholesteric liquid crystal orientated in a twisted pattern between a pair of substrates carrying transparent electrodes thereon, and polarizers.

2. Description of the Prior Art

Recently, matrix type liquid crystal display devices capable of displaying many types information, have begun to draw more attention than conventional segment type devices. However, matrix type devices have encountered problems. While they can display an image having improved resolution with an increase in the number of lines, or electrodes, the increase in the number of the electrodes, particularly the scanning lines, leads to a reduction in the duty, i.e., the time for which a signal is applied per line, and therefore, in a cross-talk margin. If a liquid crystal is used as a display element, a satisfactory contrast is not available because of the dull transmission characteristics and slow response.

The following expedients have been proposed to solve the aforesaid problems:

(1) To develop a liquid crystal material having a sharp threshold, and employ a mode of liquid crystal performance showing sharp transmission-voltage characteristics;

(2) To optimize a matrix addressing system to enlarge a driving margin ($\alpha = V_{on}/V_{off}$); and (3) To improve the electrode and panel construction to get a seemingly higher resolution.

This invention is directed to the mode of performance as referred to at (1) above. The DTN mode utilizing the light depolarization feature of the DS mode having a twist angle of 90° has recently come to attract special attention. It is reported that The DTN mode is characterized by a sharp rise in the vicinity of the threshold value and a wide viewing angle, and is suitable for a matrix display device having a large number of scanning electrodes (Tatsuo Uchida, Yutaka Ishii and Masanobu Wada: "Properties of a Display Device Using Depolarization in a Twisted Nematic Liquid-Crystal Layer (DTN-cell)", Proceedings of the SID, Vol. 21/2, 1980, pages 55 to 61).

As opposed to other kinds of display such as of characters, however, the display of a TV picture requires a halftone, and the device must be capable of responding properly to a particularly high frequency component of an image signal arising from pulse width modulation. Moreover, it is important that the proper response can be maintained for a long time.

In view of these problems, the inventors of this invention have found it useful to incorporate a specific dopant into a liquid crystal layer, and apply a specific sealing structure to a liquid crystal cell. As a result, they have succeeded in obtaining a liquid crystal display device which is suitable for the display of an image signal, and which constitutes this invention.

SUMMARY OF THE INVENTION

According to this invention, there is provided a novel and useful liquid crystal display device which can properly respond to any image signal with a low-to-high frequency distribution during the matrix driving of multiple lines using the DTN mode, for example, in the display of a TV picture, and which includes an improved sealing structure which can improve any adverse effect of an improper seal on the performance of the device.

More specifically, this invention provides in a liquid crystal display device comprising a pair of transparent substrates defining a pair of mutually facing surfaces, a transparent electrode assembly provided on each of the mutually facing surfaces of the substrates, an insulating layer covering each electrode assembly, a DTN liquid crystal layer disposed between the mutually facing insulating layers, and a polarizer provided on the opposite surface of each substrate from the liquid crystal layer, the improvement wherein the liquid crystal layer contains a dopant to the extent that the cut-off frequency $f_c$ (Hz) of the liquid crystal layer against the dynamic scattering effect satisfies the following relationship within a range of ambient temperatures:

$$16 \cdot \frac{C}{C_o} \cdot N \cdot F \gtrsim f_c \gtrsim 8 \cdot N \cdot F$$

in which N stands for the number of multiplex driving (hence 1/N being the duty ratio), F stands for the frame frequency of an image signal, C stands for the capacitance per unit area of the insulating layers, and $C_O$ stands for the capacitance per unit area of the insulating layers when they have a specific dielectric constant $\epsilon$ of about 4, and a thickness of about 100 Å; wherein said substrates are adhered to each other and sealed by two resin layers, in which the outer layer is a thermoplastic polyamide layer and the inner layer is a saturated polyester layer having a higher melting point than said polyamide.

DETAILED DESCRIPTION OF THE PREFERRED EMBODIMENT

Figure 1:
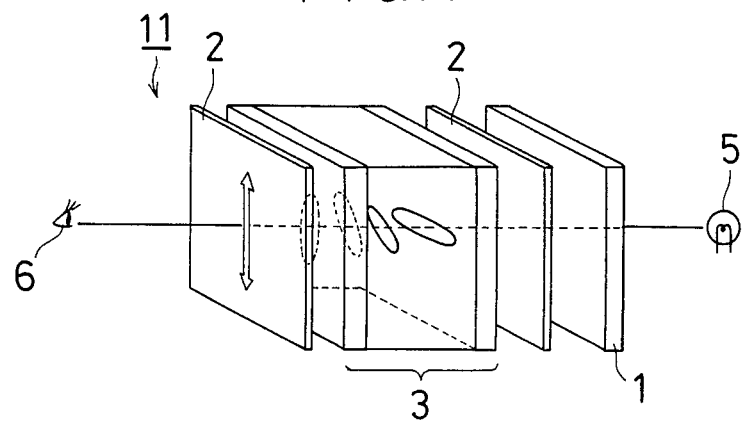
FIG. 1 is a schematic view showing by way of example the liquid crystal display device of the DTN mode embodying this invention.
Figure 2:
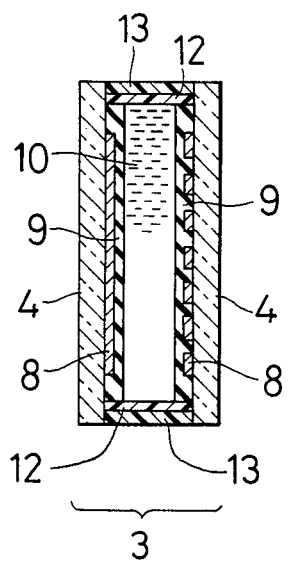
FIG. 2 is a cross-sectional view of the DS cell employed in the device shown in FIG. 1.

Referring first to FIG. 1, a preferred liquid crystal display device according to this invention is generally designated by the reference numeral 11. The device 11 comprises a diffuser 1, a pair of polarizers 2, and a dynamic-scattering liquid crystal cell with a twisted-nematic alignment, or DS cell 3. As shown in FIG. 2, the DS cell 3 comprises a pair of transparent substrates 4, a matrix transparent electrode assembly 8 on each panel, a pair of insulating layers 9 treated with an agent for orientation of the liquid crystal molecules, a liquid crystal layer 10 formed by a liquid crystal composition containing a dopant, and a pair of sealing layers 12 and 13. Referring to FIG. 1 again, numeral 5 designates an illumination device, and numeral 6 denotes a viewer.

The construction of the liquid crystal display device according to this invention is, however, not limited to the one as hereinabove described. The device permits various modifications if it essentially comprises a liquid crystal layer of the DTN type sandwiched between a pair of transparent substrates defining a pair of mutually facing surfaces each carrying thereon a transparent electrode assembly and an insulating layer treated for the orientation of liquid crystal molecules, and a polarizer provided on the opposite surface of each substrate from the liquid crystal layer, and is suitable for use in the matrix display of, for example, a TV picture.

Each transparent substrate 4 may usually comprise a glass, plastic, or like plate known in the art. Each transparent electrode assembly 8 may usually be formed by an ITO film (consisting mainly of $In_2O_3$) having a thickness of 300 to 500 Å, a NESA film (consisting mainly of $SnO_2$), or the like, known in the art. Each of the insulating layers 9 may comprise a layer of PVA or $SiO_2$, or a thin layer of $SiO_2$ coated with an agent for the orientation of liquid crystal molecules, or the like. It is preferable to use as thin a layer as possible in order to ensure proper response of the liquid crystal display device according to this invention. The light diffuser 1, polarizers 2 and illumination device 5 may be selected from those known in the art.

Attention is now directed to the principal features of this invention. Referring first to the liquid crystal layer 10, it is characterized by the quantity of the dopant present therein. The liquid crystal layer 10 contains a larger quantity of dopant than the liquid crystal layer in any known DS cell. This feature makes it possible to obtain an improved orientation of liquid crystal molecules which is particularly suitable for the display of a TV picture, or the like.

As is generally known, the driving frequency $f_d$ for a liquid crystal display device utilizing the DS effect must not be higher than the cut-off frequency $f_c$ at which the threshold voltage for the DS effect becomes infinitely high. This relationship can be expressed as follows:

$$k_1 f_d \lesssim f_c \quad (1)$$

in which $k_1$ is greater than 1.

The driving frequency $f_d$ for the liquid crystal display device 11 can basically be expressed as follows:

$$f_d = F \cdot N \quad (2)$$

in which F stands for the frame frequency of an image signal, and N stands for the number of multiplexing of the device. Accordingly, the expression (1) can be rewritten as follows:

$$k_1 \cdot F \cdot N \lesssim f_c \quad (3)$$

The expression (3) shows that the cut-off frequency $f_c$ for the liquid crystal display device 11 has a certain lower limit.

When the cut-off frequency $f_c$ is sufficiently higher than the driving frequency $f_d$, the DS cell 3 can electrically be defined as a serial equivalent circuit comprising a capacitance C formed by the insulating layers 9 and a resistance R formed by the liquid crystal layer 10. The voltage V actually applied to the liquid crystal layer 10 is:

$$V = \frac{E}{\sqrt{1 + \left(\frac{1}{2\pi f_d C R}\right)^2}} \quad (4)$$

in which E stands for source voltage.

In order to obtain the voltage V required for application to the liquid crystal layer when the source voltage E is maintained constant, the following relationship must be maintained:

$$\frac{1}{2\pi f_d C R} \lesssim k_2 \quad (5)$$

As is well known, $$\frac{1}{R} = k_3 \cdot \sigma \quad (6)$$

and $$f_c = k_4 \cdot \delta \quad (7)$$

In view of the expression (2) taken with the expressions (6) and (7), the expression (5) can be rewritten as follows:

$$f_c \lesssim k_5 \cdot F \cdot N \cdot C \quad (8)$$

in which $$k_5 = \frac{2\pi k_2 k_4}{k_3}.$$

The expression (8) shows that the cut-off frequency $f_c$ for the liquid crystal display device 11 has a certain upper limit, too.

The inventors of this invention have prepared a lot of liquid crystal display devices containing different quantities of dopant in their liquid crystal layers, and conducted a lot of experiments for the display of images. As a result, they have discovered that an image which is satisfactory in contrast and halftone can be produced if the dopant is incorporated in the quantity corresponding to the cut-off frequency $f_c$ which satisfies the expression (3) when $k_1$ is 8, and the expression (8) when $k_5$ is equal to $16/C_O$ in which $C_O$ stands for the capacitance per unit area of the insulating layers when they have a specific dielectric constant $\epsilon$ of about 4, and a thickness about 100 Å.

In order to provide a satisfactory image display, therefore, the liquid crystal display device 11 of this invention contains the dopant in the quantity corresponding to the cut-off frequency $f_c$ which satisfies the following relationship:

$$\frac{16}{C_o} \cdot C \cdot F \cdot N \gtrsim f_c \gtrsim 8 \cdot N \cdot F \quad (9)$$

The quantity of the dopant thus defined is at least about 10 times larger than that which hitherto been employed.

The liquid crystal layer into which the dopant is incorporated may be composed of a nematic or long-pitched cholesteric liquid crystal which is usually employed in a DS cell. It is particularly suitable to use a nematic liquid crystal of negative dielectric anisotropy.

Examples of such liquid crystal material include the following:

(a) 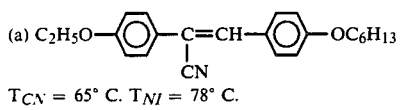
and other stilbene liquid crystals;
$T_{CN} = 65°$ C. $T_{NI} = 78°$ C.

(b) 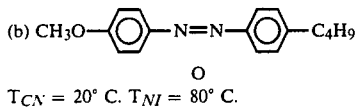
and other azoxy liquid crystals;
$T_{CN} = 20°$ C. $T_{NI} = 80°$ C.

(c) 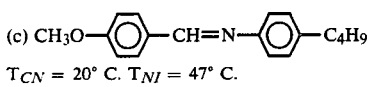
and other Schiff liquid crystals;
$T_{CN} = 20°$ C. $T_{NI} = 47°$ C.

(d) 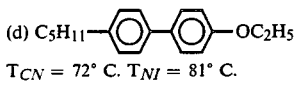
and other biphenyl liquid crystals;
$T_{CN} = 72°$ C. $T_{NI} = 81°$ C.

(e) 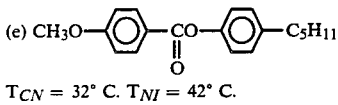
and other ester liquid crystals;
$T_{CN} = 32°$ C. $T_{NI} = 42°$ C.

(f) 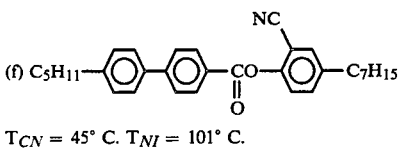
and other biphenyl ester liquid crystals;
$T_{CN} = 45°$ C. $T_{NI} = 101°$ C.

(g) 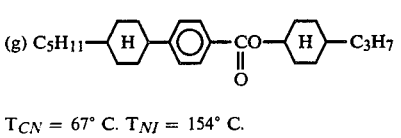
and other phenylcyclohexane ester liquid crystals;
$T_{CN} = 67°$ C. $T_{NI} = 154°$ C.

(h) 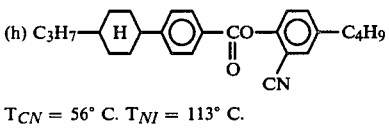
and other phenylcyclohexane ester liquid crystals;
$T_{CN} = 56°$ C. $T_{NI} = 113°$ C.

(i) 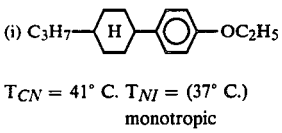
and other phenylcyclohexane liquid crystals;
$T_{CN} = 41°$ C. $T_{NI} = (37°$ C.) monotropic (j) 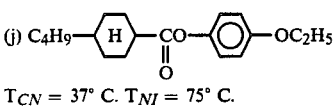
and other cyclohexane ester liquid crystals.
$T_{CN} = 37°$ C. $T_{NI} = 75°$ C.

The liquid crystal may be either a mixture of liquid crystals belonging to one of the aforesaid groups, or a mixture of liquid crystals selected from two or more groups. It is also possible to use a mixture of liquid crystals other than those shown above if it has negative dielectric anisotropy. Among others, it is preferable to use a mixed liquid crystal consisting mainly of Schiff's-base liquid crystal materials.

Moreover, it is possible to incorporate a minor quantity of an optically active substance such as cholesteryl nonanoate and

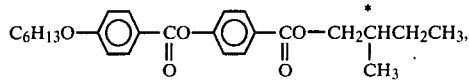

or other additives in order to improve various properties of the liquid crystal layer.

A variety of quaternary ammonium compounds known in the art may be suitable for use as the dopant in the liquid crystal display device of this invention. As according to this invention, the dopant is incorporated in a larger quantity than has been the case in the prior art, it is better to use salts of organic acids as specifically shown below by way of example than salts of strong acids, such as $(C_4H_9)_4N^+Br^-$, since the former salts are less likely to influence the decomposition of the liquid crystal molecules.

Examples of particularly suitable quaternary ammonium compounds include the following:

(a) Tetrabutylammonium salt of benzoic acid

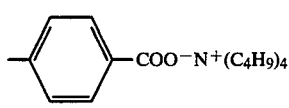

(b) Tetrabutylammonium salt of p-nitrobenzoic acid

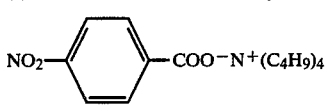

(c) Tetrabutylammonium salt of p-chlorobenzal-p'-aminobenzoic acid

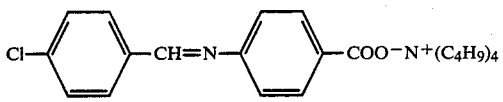

(d) Tetrabutylammonium salt of p-carboxybenzal-amino-p'-chlorobenzene

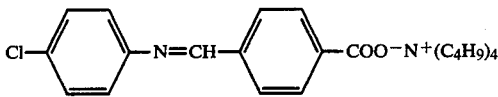

(e) Tetrabutylammonium salt of terephthalic acid

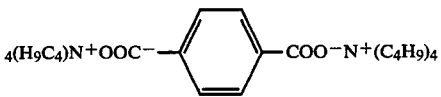

(f) Tetrabutylammonium salt of 3,5-dinitrobenzoic acid

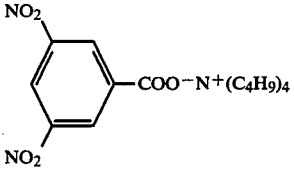

(g) Tetrabutylammonium salt of p-butoxybenzoic acid

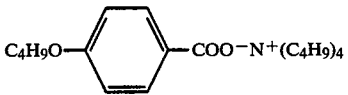

(h) Tetrahexylammonium salt of benzoic acid

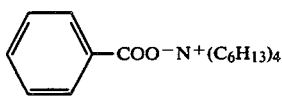

Various other compounds may be used as the dopant if they are satisfactory in solubility, electrical and electrochemical stability, freedom of any damage to the liquid crystal, durability, and other factors.

According to another feature of this invention, the liquid crystal cell has a double sealing structure composed of a sealing layer 13 of a thermoplastic polyamide, and an auxiliary sealing layer 12 of saturated polyester provided inwardly of the polyamide layer.

According to this invention, the dopant is incorporated into the liquid crystal layer in the quantity which corresponds to the cut-off frequency $f_c$ as hereinabove described, and which is considerably, or usually at least 10 times, larger than that which has hitherto been employed in a portable electronic calculator, or the like.

For sealing the liquid crystal cell, it is appropriate to use such material as is capable of protecting the liquid crystal molecules in the liquid crystal layer against exposure to the atmospheric air as far as possible. Above all, a liquid crystal layer composed mainly of a Schiff's-base liquid crystal is unstable in an electro-chemical reaction or in the presence of moisture, and is very likely to be affected by the atmospheric air. Therefore, it has been usual practice to use a thermoplastic polyamide, an epoxy resin, or the like, alone for the sealing purpose. The experiments conducted by the inventors of this invention have, however, indicated that those sealing materials do not satisfactorily prevent the influence of the atmospheric air in the event a large quantity of dopant is incorporated as hereinabove mentioned, but that the liquid crystal is likely to be affected by the atmospheric air particularly when the liquid crystal display device is used for a long time of operation, resulting in a drop in the transition point of the liquid crystal, and eventually its failure to maintain its liquid crystal state. As a result of repeated experiments, the inventors of this invention have been able to establish a method for sealing liquid crystal cell for a liquid crystal containing a large quantity of dopant, particularly a liquid crystal system consisting mainly of a Schiff's-base liquid crystal.

Suitable examples of the thermoplastic polyamide for the sealing layer 13 in the device of this invention include nylon 4, nylon 6, nylon 66, nylon 69, nylon 610, nylon 612, nylon 7, nylon 8, nylon 9, nylon 11 and nylon 12, and copolymers of two or more thereof, such as nylon 6/66/12, 6/69/12, 6/610/12, 6/612/12, 6/66/11, 6/66/69/12, 6/66/610/12, 6/66/612/12, 6/66/11/12 and 6/69/11/12. It is desirable to use a polyamide or copolymer having as high a melting point as possible in order to obtain a reliable seal.

Suitable examples of the saturated polyester for the sealing layer 12 include polyethylene terephthalate, polybutylene terephthalate and poly-1,4-cyclohexylenedimethylene terephthalate, and copolymers of two or more thereof. Polyethylene terephthalate is particularly preferable.

Figure 3:
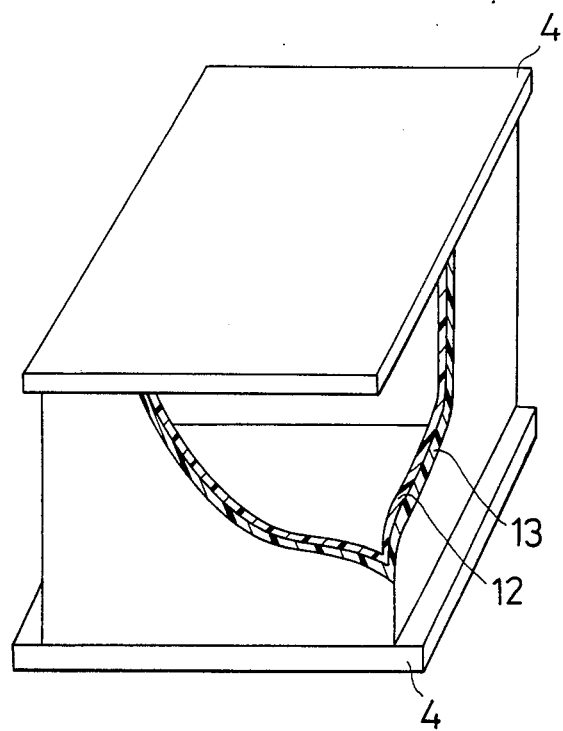
FIG. 3 is a perspective view of the DS cell in the device of FIG. 1, which is partly broken away to show the sealing structure.

A method of adhering and sealing the substrates of the liquid crystal cell of this invention will now be described by way of example. After a powder of glass fibers has been applied to each glass substrate having a desired electrode and insulating layer in order to form a spacer between the substrates, a film of a thermoplastic polyamide formed in the shape of a frame extending along the entire periphery of the substrate is placed on one of the substrates. Then, a film of saturated polyester formed in the shape of a frame is placed inwardly of the polyamide frame, i.e., on the surface facing the liquid crystal (FIG. 3). Then, the other glass substrate is placed on the polyamide and saturated polyester frames, and the glass substrates are held under pressure by a compressing instrument and heated to be fused with the frames.

However, this invention is not limited to the method as explained above or its adhering structure.

The film of a thermoplastic polyamide should have a thickness which is usually 20 to 50 $\mu$m, and preferably about 40 $\mu$m.

The film of saturated polyester should have a thickness which is usually 6 to 20 $\mu$m, and preferably about 10 $\mu$m.

It is possible to employ any heating condition if the film of a thermoplastic polyamide can be properly fused.

Thus, it is possible to obtain a double sealing structure comprising a layer of a thermoplastic polyamide and a layer of saturated polyester.

Then, a liquid crystal containing a specific quantity of dopant is incorporated, and the injection port is closed to define a liquid crystal cell, and this cell may be used to form a liquid crystal display device according to this invention.

The seal having a specific double structure in the liquid crystal display device of this invention is superior in the capacity of shutting off the atmospheric air to any conventional seal composed of a single layer of a thermoplastic polyamide, epoxy resin, or the like. Therefore, even if a liquid crystal (particularly a Schiff's-base liquid crystal) containing a large quantity of dopant is used for a long time of operation, the liquid crystal is least likely to be affected by the atmospheric air (particularly moisture present therein), and maintains a satisfactory liquid crystal state.

The liquid crystal layer in the device of this invention contains a specific quantity of dopant which is suitable for the display of an image. According to this invention, it is possible to improve any adverse effect of an improper seal on the performance of the display device and obtain an image which is satisfactory in contrast and halftone in the display of an image signal using a DTN mode with a low-to-high frequency distribution. The device of this invention is particularly useful for the display of a TV picture by commercial TV broadcasting. While the frame frequency $F_{TV}$ for commercial TV broadcasting is 30 Hz, the liquid crystal display device usually employs a frame frequency which is twice higher than $F_{TV}$, or 60 Hz, in order to eliminate any flicker.

The invention will now be described in further detail by way of example.

TABLE 1 shows liquid crystal materials and an orientation agent by way of example. The liquid crystal composition fully satisfy the cut-off frequency (exceeding 30 kHz) when a matrix display device having 120 scanning lines, an electrode structure including row electrodes centrally divided into an upper and a lower group, and a frame frequency of 60 Hz is driven by the optimized amtlitude-selecting method with a driving voltage having a frequency distribution mainly in the range of 60 Hz to 7.2 kHz.

TABLE 1

| Liquid crystal composition: | | |
|---|---|---|
| Liquid crystal materials: | p-Methoxybenzylidene-p'-n-butylaniline | 45 wt. % |
| | p-Ethoxybenzylidene-p'-n-butylaniline | 45 wt. % |
| (Additives:) | 1-Cyano-1-(p-ethoxyphenyl)-2-(p-hexyloxyphenyl)-ethylene | 9.82 wt. % |
| | Cholesteryl nonanoate | 0.18 wt. % |
| Dopant: | Tetrabutylammonium-3,5-dinitrobenzoate | 0.75 wt. % of liquid crystal materials |
| Orientation agent: | γ-Glycidoxypropyltrimethoxysilane (Toray Silicone Co., Ltd.) was applied to an insulating layer of $SiO_2$ having a thickness of about 100 Å. | |

Figure 4:
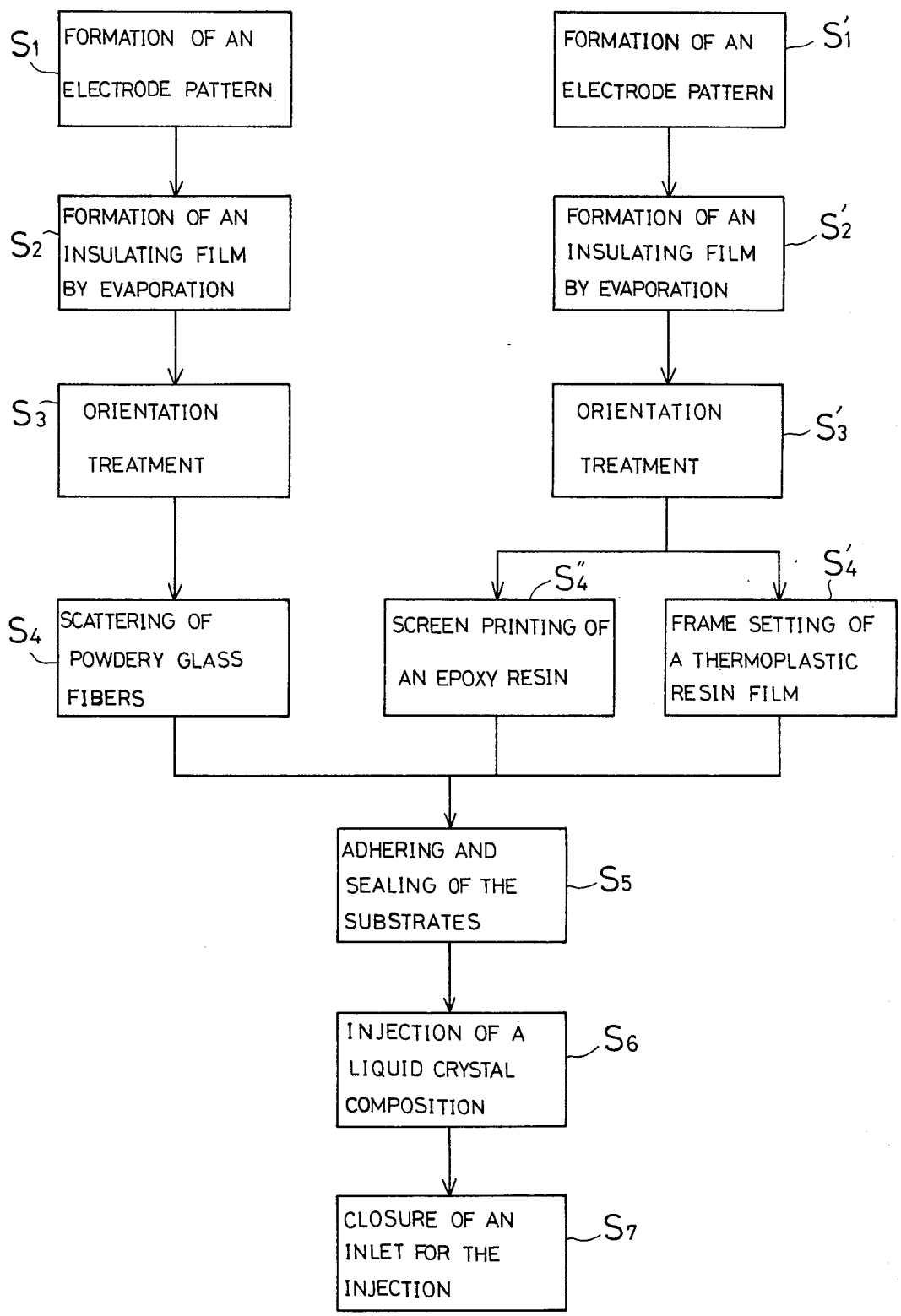
FIG. 4 is a flow chart showing the process for preparing a liquid crystal cell.

Tests were conducted by using the liquid crystal composition and the sealing material hitherto employed in the art. FIG. 4 shows a flow chart for the process for preparing a liquid crystal cell. An insulating film of $SiO_2$ or the like is formed by evaporation on each glass substrate having a desired electrode pattern formed thereon, and the insulating films are treated for orientation purpose (steps $S_1$ to $S_3$, or $S_1'$ to $S_3'$). Spacers, such as powdery glass fibers, are applied onto the whole surface of the substrates to define a uniformly wide gap between the panels (step $S_4$). After the substrates are sealed together, the liquid crystal composition is injected into the space defined between the substrates (steps $S_5$ to $S_7$).

Various known materials capable of screen printing were used for the sealing purpose, as shown in TABLE 2, i.e., a combination of an epoxy resin (SOMAL manufacturing Co., Ltd., R-2401) and a curing agent (SOMAL manufacturing Co., Ltd., HC-11) a combination thereof with a silane coupling agent as an auxiliary bonding agent (Toray Silicone Co., Ltd., SH6040), a one-compartment epoxy resin (Amicon Far East Ltd., Uniset A316-8), and thermoplastic polyamides of the nylon 12 series (DAICEL CHEMICAL INDUSTRIES Ltd., Diamide 2000, 3000 and 7000).

The liquid crystal cells prepared as hereinabove described were left to stand at room temperature in a dessicator containing water for the purpose of an acceleration test for evaluating the reliability of the sealing material against humidity. The deterioration of the liquid crystal was examined for the evaluation of the sealing material. The liquid crystal cells employing the aforesaid known sealing materials were easily affected by the atmospheric air, showed a drop in transition point, and fails to maintain their liquid crystal state. The results of the tests are shown in TABLE 2, in which various symbols indicate the following results:

o—No deterioration of liquid crystal material (virtually no change in transition point);
Δ—Partial deterioration (slight change in transition point);
x—Virtually total deterioration (substantial change in transition point).

TABLE 2

| | Testing time (hours) | | | | |
|---|---|---|---|---|---|
| Sealing material | 100 | 150 | 200 | 250 | 300 |
| Epoxy resins: | | | | | |

TABLE 2-continued

| | Testing time (hours) | | | | |
|---|---|---|---|---|---|
| Sealing material | 100 | 150 | 200 | 250 | 300 |
| R-2401 & HC-11 (10:3) Seal thickness: 7 μm (Sealing conditions: 80° C., 1 hr & 120° C., 1 hr) | x | — | — | — | — |
| R-2401 & HC-11 (10:3) + SH6040 (coupling agent) Seal thickness: 7 μm (Sealing conditions: Same as above) | x | — | — | — | — |
| Uniset A316-8 Seal thickness: 7 μm (Sealed at 150° C. for 30 min.) | x | — | — | — | — |
| Thermoplastic films: | | | | | |
| Diamide film 2000 (m.p. 95 to 105° C.; thickness 40 μm) | Δ | x | — | — | — |
| Diamide film 3000 (m.p. 95 to 120° C.; thickness 40 μm) | Δ | x | — | — | — |
| Diamide film 7000 (m.p. 175° C.; thickness 40 μm) | o | Δ | x | — | — |

The Diamide films were sealed at 180° C. for 30 min.

Similar tests were conducted for the liquid crystal cells prepared by employing the sealing material according to this invention, i.e., a combination of thermoplastic polyamide and saturated polyester films. Sealing was carried out at about 180° C. for 30 minutes. A film of polyethylene terephthalate having a molecular weight of 15,000 to 20,000, a melting point of 260° C.±1° C., and a film thickness of about 10 μm (Mitsubishi Plastic Industries Ltd., DIAFOIL) was used to form a saturated polyester layer. The results of the tests are shown in TABLE 3.

TABLE 3

| | Testing time (hours) | | | | |
|---|---|---|---|---|---|
| Sealing material | 100 | 150 | 200 | 250 | 300 |
| Diamide film 2000 (40 μm thick) + saturated polyester film | o | Δ | Δ | x | — |
| Diamide film 3000 (40 μm thick) + saturated polyester film | o | o | o | Δ | Δ |
| Diamide film 7000 (40 μm thick) + saturated polyester film | o | o | o | o | o |

It is noted from TABLE 3 that the sealing structure composed of a combination of thermoplastic polyamide and saturated polyester films provides a better shield against moisture, and can protect the liquid crystal from any possible effect of the atmospheric air for a longer time, than any conventional seal formed by a thermoplastic polyamide or epoxy resin alone. It is particularly noteworthy that among various thermoplastic polyamides, the use of a film having a high melting point, such as Diamide 7000 (m.p. 175° C.), and lined with a saturated polyester film can provide a highly reliable liquid crystal cell. A liquid crystal display device including such a liquid crystal cell has been found to be capable of displaying a TV picture which is satisfactory in contrast and halftone.

What is claimed is:

1. A matrix liquid crystal display device for video image using DTN mode comprising a pair of transparent substrates defining a pair of mutually facing surfaces, a transparent electrode assembly provided on each of said mutually facing surfaces, an insulating layer with orienting property formed on said electrode assembly, a liquid crystal layer formed by depolarization in a twisted nematic layer, said liquid crystal being nematic with a negative dielectric anisotropy, said liquid crystal layer being disposed between said mutually facing insulating layers, and a polarizer provided on the opposite surface of each of said substrates from said liquid crystal layer, said liquid crystal layer satisfying the following relationship within a range of ambient temperatures:

$$16 \cdot \frac{C}{C_o} \cdot N \cdot F \gtrsim f_c \gtrsim 8 \cdot N \cdot F$$

in which N stands for the number of multiplex driving, F stands for the frame frequency of an image signal, C stands for the capacitance per unit area of said insulating layers, and $C_o$ stands for the capacitance per unit area of said insulating layers when they have a specific dielectric constant $\epsilon$ of about 4, and a thickness of about 100 Å the fc value of the device being at least about 29 kHz, whereby the reproduction of a video image with a halftone is achieved; said substrates being adhered to each other and sealed by two resin layers in which the outer layer is a thermoplastic polyamide layer and the inner layer is a saturated polyester layer having a higher melting point than said polyamide.

2. A liquid crystal display device as set forth in claim 1, wherein said frame frequency F is 60 Hz, so that said device may be used for the display of a TV picture by commercial TV broadcasting with a frame frequency $F_{TV}$ of 30 Hz.

3. A device as set forth in claim 2, wherein said liquid crystal layer contains a dopant.

4. A device as set forth in claim 3, wherein said insulating layers have a thickness of about 100 Å and a specific dielectric constant $\epsilon$ of about 4, said frame frequency F is 60 Hz, and said liquid-crystal layer contains said dopant to the extent that said cut-off frequency $f_c$ satisfies the following relationship:

$$960N \geq f_c \geq 480N$$

so that said device may be used for the display of a TV picture by commercial TV broadcasting at a frame frequency of $F_{TV}$ of 30 Hz.

5. A device as set forth in claim 1, wherein said liquid crystal layer contains a dopant.

6. A device as set forth in claim 5, wherein said dopant comprises a quaternary ammonium compound.

7. A device as set forth in claim 6, wherein said dopant comprises tetrabutylammonium-3-5-dinitrobenzoate.

8. A device as set forth in claim 1, wherein said liquid-crystal layer has a thickness of $7\mu \pm 1\mu$.

9. A device as set forth in claim 1, wherein $f_c$ is in the range of from about 29 to about 58 kHz.

10. A liquid crystal display device as set forth in claim 1, wherein said liquid crystal layer comprises a Schiff's-base liquid crystal composition.

11. A liquid crystal display device as set forth in claim 1 or 2, wherein said thermoplastic polyamide is a substance selected from the group consisting of nylon 4, nylon 6, nylon 66, nylon 69, nylon 610, nylon 612, nylon 7, nylon 8, nylon 9, nylon 11 and nylon 12, and copolymers of two or more thereof.

12. A liquid crystal display device as set forth in either claim 1 or 2, wherein said saturated polyester comprises a substance selected from the group consisting of polyethylene terephthalate, polybutylene terephthalate and poly-1,4-cyclohexylenediamethylene terephthalate, and copolymers of two or more thereof.

13. A liquid crystal display device as set forth in claim 4, wherein said saturated polyester is polyethylene terephthalate.

* * * * *